US010533903B2

(12) United States Patent
Mischke

(10) Patent No.: US 10,533,903 B2
(45) Date of Patent: Jan. 14, 2020

(54) HEAT TRANSFER MEASUREMENT AND CALCULATION METHOD

(71) Applicant: Gerald Mischke, Weinstadt-Endersbach (DE)

(72) Inventor: Gerald Mischke, Weinstadt-Endersbach (DE)

( * ) Notice: Subject to any disclaimer, the term of this patent is extended or adjusted under 35 U.S.C. 154(b) by 748 days.

(21) Appl. No.: 14/399,570

(22) PCT Filed: May 10, 2013

(86) PCT No.: PCT/EP2013/001385
§ 371 (c)(1),
(2) Date: Nov. 7, 2014

(87) PCT Pub. No.: WO2013/167278
PCT Pub. Date: Nov. 14, 2013

(65) Prior Publication Data
US 2015/0100267 A1    Apr. 9, 2015

(30) Foreign Application Priority Data

May 9, 2012   (DE) .................. 10 2012 009 080

(51) Int. Cl.
*G01K 17/06* (2006.01)
*G01K 13/02* (2006.01)

(52) U.S. Cl.
CPC .............. *G01K 17/06* (2013.01); *G01K 13/02* (2013.01)

(58) Field of Classification Search
CPC ........ G01K 17/20; G01K 17/06; G01K 13/02; G01K 17/00; G01J 5/10; G01J 2005/0077; G06F 17/5004; G06F 2217/80
See application file for complete search history.

(56) References Cited

U.S. PATENT DOCUMENTS 4,343,182 A * 8/1982 Pompei ............... G01J 5/02
374/117
4,928,012 A * 5/1990 Lorenz ............... G01J 1/04
250/338.1
6,422,743 B1   7/2002 Nirmalan
(Continued)

FOREIGN PATENT DOCUMENTS

JP          2000 206268           7/2000
WO     WO 2012028829 A1 *  3/2012 ............. G01K 17/20

OTHER PUBLICATIONS

Revel G M et al: "Paper; Development and experimental evaluation of s thermography measurement system for a real-time monitoring of comfort and heat rate exchange in the built environment; Development and experimental evaluation of a thermography and measurement system for real-time monitoring of comfort and heat rate exchange". Measurement Science and Technology, IOP, Bristol, GB. Bd. 23, Nr. 3, Feb. 1, 2012 (Feb. 1, 2012), Seite 35005, XP020219569. ISSN: 0957-0233, DOI: 10.88/0957-0233/23/3/03505. Section 2.3, 2.4; Seiten 2-6; Abbildungen 1,7.
(Continued)

*Primary Examiner* — Kyle R Quigley

(74) *Attorney, Agent, or Firm* — Shlesinger, Arkwright & Garvey LLP

(57) ABSTRACT

A method to determine the heat transfer through some enveloping surface is being presented, where a convective as well as a radiation heat-transfer is considered.

13 Claims, 10 Drawing Sheets

(56) References Cited

U.S. PATENT DOCUMENTS

| | | | |
|---|---|---|---|
| 2003/0160757 A1 | 8/2003 | Shirai | |
| 2010/0273277 A1* | 10/2010 | Qin | H01J 37/32522 438/5 |
| 2012/0084019 A1* | 4/2012 | Khonsari | C22C 38/00 702/35 |
| 2012/0307046 A1* | 12/2012 | Lundberg | G01J 5/0022 348/135 |
| 2012/0330626 A1* | 12/2012 | An | G01K 17/20 703/2 |
| 2013/0226503 A1* | 8/2013 | Mangematin | G01N 25/00 702/136 |

OTHER PUBLICATIONS

T Astarita et al: "A survey on infrared thermography for convective heat transfer mearuements", Optics & Laser Technology, Bd. 32, Nr. 7-8, Oct. 1, 2000 (Oct. 1, 2000), Seiten 593-610, XP055082176, ISSN: 0030-3992, DOI: 10.1016/S0030-3992(00)00086-4 section 2 and 4.1.1, equations 5 and 10.

Jonas Allegrini et al: "Analysis of concetive heat transfer at building faA PRG ades in street cnayons and its influence on the predictions of space cooling demand in buildings". Journal of Wind Enginerring and Industrial Aerodynamics, BD. 104, Feb. 24, 2012 (Feb. 24, 2012), Seiten 464-473, XP028429912, ISSN: 0167-6105, DOI: 10.1016/J.JWEIA. 2012.02.003 [gefunden am Jul. 2, 2012] Abstract, section 2.3; Seite 467.

Strand R K et al: "Modeling radiant heating and cooling systems: integration with a whole-building simulation program", Energy Buildings, Lausanne, CH, Bd. 37, Nr. 4, Apr. 1, 2005 (Apr. 1, 2005), Seiten 389-397, XP027756761, ISSN: 0378-7788 [gefunden am Apr. 1, 2005] section 1. Introduction; Seite 389.

Wolfgan Feist: "Passiv-VerwaltungsgebaudeWagner & Co. in Colbe", Feb. 2002 (Feb. 2002), XP002714823, Gefunden in Internet: URL:http://www.enob.info/fileadmin/media/Publikationen/Enbau/Projecktberichte/03_MonitoringAB2_Wagner_p2_k.pdf [gefunden am Oct. 14, 2013] Seite 13,Absatz 1, Seite 15, Absatz 2.

Jonathan D Markley et al: "Hybridization of Photogrammetry and Laser Scanning Technology for As-Built 3D CAD Models", 2008 IEEE Aerospace Conference; Mar. 1-8, 2008; Big Sky; MT, USA, IEEE, Piscataway, NJ, USA, Mar. 1, 2008 (Mar. 1, 2008), Seiten 1-10, XP031256520, ISBN: 978-1-4244-1487-1 Section 4; Seiten 4-7.

International Preliminary Report on Patentability, PCT/EP2013/001385, dated Nov. 20, 2014.

* cited by examiner

Building Energy-Losses  —Sources—

Energy-Losses Buildings (typ.)
-Heat-Flow Model-

Measuring physics - computation of element-dimensions/-geometry

THERMO-U - overall system to measure energy-losses

HEAT TRANSFER MEASUREMENT AND CALCULATION METHOD

RELATED APPLICATIONS

This is national stage of International PCT Application No. PCT/EP2013/001385, filed on May 10, 2013, which claims priority from Germany Application No. 10 2012 009 080.3, filed on May 9, 2012, both of which are hereby incorporated by reference.

The invention refers to a method for measuring and calculating a heat and/or energy transmission through an enveloping surface.

An integrated HW- and SW-system for the measurement and the calculation of heat losses, thermal resistances, thermal capacities $C_H$ and of the corresponding thermal time constants $\tau_H$ of surfaces of (even parts of) machines, constructions, buildings etc. is presented in particular.

The invention addresses a multitude of measurement and calculation methods as well as IT-systems for the measurement, illustration, determination and analysis of energy losses and characteristics in the building, the engineering and the electrical industry. To achieve these objectives, thermal imaging, thermodynamics, photogrammetry and (optical) distance measurement technologies are used in particular.

STATE OF THE ART

A major application area of the invention is the building and construction industry. With this application area in mind, the current state of the art and its respective improvement made possible by the invention are described.

To determine (thermal) energy losses on-site, only very expensive measurement and analysis methods are applicable up to now. For any building and/or rehabilitation project the respective energy characteristics ($R_H$, $C_H$, $\tau_H$, etc.) of the corresponding construction components/parts are essential. In general, these characteristics have to be determined individually, which is a most complex and costly process.

Different FRG- and EU-initiatives are aiming at a dramatic and sustainable reduction of the primary energy consumption of buildings (e.g. ENEV 2009/2012/2014, EEG, etc.). This leads to a high level of sophistication and to a wide spread use on of the thermal modeling tools in the EU. Building physics established the basis for static and dynamic simulation models for heat transfer processes through almost arbitrary composed materials, construction elements and geometries of buildings and their respective parts. The SW-tool "Energieberater Plus 18599" of the German firm Hottgenroth or the simulation-package COMSOL of the Swedish firm COMSOL are just examples for this development. Each of these tools does need most detailed and comprehensive information of the geometrical, mechanical and physical (thermal) characteristics of each element of the whole construction as input parameters. For the physical characteristics of the respective materials, there exist quite elaborate public parameter libraries from (semi) governmental institutions like e.g. CSTB in France. These (material) parameters have been determined using most elaborate and costly calorimetric measurement technologies. These technologies can only be applied in labs and, thus, up to now there is no on-site measurement technology available to determine thermal resistances, capacities etc. of building components (e.g. walls, windows, etc.). On top of that the influence of the respective building environment (e.g. slopes, neighbor buildings etc.) is in general neglected and/or its respective influence is represented by some most rudimentary parameters like average air-temperatures (month, year). The influence of wind, humidity, rain, snow etc. is in general neglected as well as the most important influence of the radiation of the sun and the sky.

The building technology application area illustrates in particular that most of the necessary information is often not available on-site nor is it easily accessible. Quite often extensive efforts, e.g. via a core hole drilling, are necessary to acquire the necessary information on structure and kind of materials used to build the walls under investigation. In general, only for new constructions this kind of detailed information is readily available in the form of drawings and/or bill of materials. Buildings usually do have a medium lifetime of some 30 to 60 years. Thus, from the time of construction until the first major reconstruction works about a medium lifetime later, most of the information on the kind and the structure of the building components (is lost. Thus, in case of rehabilitation works in particular, you are forced to acquire this information in some lengthy expensive manual and error prone process. The structure of the corresponding floors and walls can only be determined by expensive and time-consuming core hole drilling. The use of the described building simulation models actually requires all these expensive examinations as by now sufficiently exact and cost-efficient measuring methods for the needed parameters do not exist. This currently unsufficient measuring technique according to the state of the art leads to a time-consuming long and generally even error prone data acquisition for the energy restructuring which is even in case of a single family home very time-consuming.

The lacking explicit incorporation of the physically correct energy transport mechanisms into the device and its respective environment is up to now another most decisive deficit of state of the art of standards and modeling in energy technology for buildings. These transfer mechanism are the conductive flow of heat into the underground with a
    mostly unknown internal structure, an unknown temperature profile and an unknown physics,
  the convective heat dissipation from/to the surrounding
    air,
  as well as the (IR-) heat radiation from/to the respective
    (IR-) environment and from/to the sky/space in particular.

The last two mechanisms do certainly not correspond to the average ambient air temperatures used in the respective simulation models. They do show in reality quite different values. The ENEV and/or DIN-ISO model-parameters $R_{Si}$ and $R_{Se}$ thus do not represent a physical reality. They are workarounds to overcome the intrinsic model-errors and to achieve on an annual or monthly basis sufficiently reliable and realistic simulation results. For measurement purposes they are misleading at best.

Concluding, we would like to point out that at the time being, there is no optical or other measurement technology available which allows a quick determination of the physical dimensions of a building/component surface with sufficient accuracy with help of a one-picture "measuring camera" The known industrial measurement technologies are not suitable. A cost effective, integrated and easy to use measuring method with a reasonably degree of precision based on existing technologies still has to be developed.

Keeping this in mind, a method corresponding to the features mentioned in claim 1 and an arrangement corresponding to claim 13 is proposed. The different possible realizations of such an arrangement unfold corresponding to the depending claims and the respective descriptions in this document.

Thus, a method is proposed to calculate/compute a heat flow through an enveloping surface, where the respective contributions of convection and thermal radiation are considered. To evaluate the heat transfer by radiation the respective surface temperatures of the enveloping surface and the (radiation) temperature of the respective backscattering hemisphere surrounding, the enveloping surface is considered.

To measure the surface temperatures a thermal imaging camera could be used. The same holds for the measurement of the (radiation) temperature of the backscattering hemisphere. It is proposed to typically use the very same IR-imaging camera for both tasks, enabling a direct measuring to be performed.

Additionally, the geometry of the enveloping surface is determined while performing the convective heat exchange measurement. Preferably the measurement of the geometry is performed by a camera, preferably the IR-imaging camera used for measuring the surface temperature and/or the surface temperature distribution.

In the arrangement the heat flow via heat conduction can be considered too. A typical application area is an enveloping surface defined by a building.

In case the measuring object is partially covered by or integrated into some unknown heat conducting material, here for short called subsoil, the conductive heat flow into the subsoil can be determined by taking the difference of an integral measurement from the inside from the one taken from the outside.

In the arrangement the surface temperatures of the respective surface elements can be measured contact-free via camera or sensor and their actual spatial positions are determined using an integrated geometry measurement system simultaneously.

Additionally, the radiation energy flow from the respective environment into each surface-element can be determined via an integrated $2\pi$-hemisphere radiation sensor, at least according to 2 solid angles ($\varphi_{sky}$, $\varphi_{earth}$) separately. These results are collected simultaneously with the respective surface temperature measurements.

Additionally, the $2\pi$-hemisphere radiation sensor can partition the hemisphere to be measured into M×K equal/different spatial angles, it can measure the respective radiation temperatures separately and it can finally transmit the corresponding results proportionately to the integrated measurement system.

Besides, the camera integrated geometry measurement system can measure, simultaneously to the temperature measurements three or more points ($P_1$, $P_2$, $P_3$, etc.) on the respective measurement plane (BE1) using at least three distance meters ($S_1$, $S_2$, $S_3$, etc.) with known mutual angles angles ($\alpha_{12}$, $\alpha_{13}$, $\alpha_{23}$, etc.) to assign real physical dimensions (e.g. in m) to each image pixel via simple trigonometric calculations. Doing this it can supply the overall image of the (thermal) measuring camera with real x/y/z coordinates.

Furthermore, we present an arrangement for the calculation/computation of a heat transfer through an enveloping surface, in particular for the execution of one of the preceding methods with a processing unit designed to consider a heat radiation and a heat convection, where for the determination of the heat radiation a surface temperature of the enveloping surface and a back-radiation temperature of a the hemisphere encircling the respective surface-element is considered.

This arrangement can comprise a measuring and a thermal camera respectively, and in one arrangement exactly one camera.

In the following the arrangement is called measuring system which can comprise an analysis system too.

An integrated analysis system determines all convective and radiation energy flows through the surface of a component in nature, direction and amount. From this information it determines the corresponding energy characteristics of the very components. It consists of at least two environmental-parameters measuring devices, one back radiation meter, one (thermal) IR-camera and an evaluation system for performance analysis and reporting.

The measurement of energy characteristics as well as of geometries in the building industry is made possible. The measurement of corresponding problems in tool making, electrical and/or plant engineering is possible too.

With this method it is possible to measure the necessary parameters to determine the (heat-) energy losses physically correct, completely, fast and without excessive equipment and time needs. Afterwards the corresponding energy loss characteristics are computed, as automatically as possible. These measurement and analysis parameters are in particular
- the 3D-geometry and structure of the measurement object with all relevant surfaces in real 3D-coordinates,
- the (energy-flow) relevant parameters of the surrounding media/fluids of the respective measuring object like $T_{air}$, $v_{air}$, humidity, . . . ,
- the (energy-flow) relevant parameters of each surface taking part in the energy-exchange of the respective measurement object like $T_{Si}/T_{Se}$ (i,k), inclination, roughness, . . . ,
- the (energy-flow) relevant parameters of the measuring device's surroundings and of all objects within which take part in the (radiation-) energy exchange.

With these parameters and on the basis of a physically correct model- and application case-choice, the heat-flow into the measurement object can now be determined in amount and direction.

The invention, thus, has to tackle the following seven tasks to become an integrated measurement- and analysis-system to determine heat-losses via enveloping surfaces of devices, installations and buildings and to determine their respective thermal resistances ($R_H$ or $U_H=1/R_H$), effective thermal capacities $C_H$ as well as their corresponding thermal inertia $\tau_H$:

1. Simple, cost effective and fast measurement/determination of the respective 3D-dimensions of some measuring object (walls, surfaces, etc.) in all three spatial directions with sufficient precision for a further use in (building-) modeling and simulation tools.
2. Simple, cost effective and fast determination of structures/objects (e.g. cornice, window, door, roof, balcony, etc.) on or within the very 3D-measuring object (walls, surfaces, etc.) with sufficient precision for a further use in (building-) modeling and simulation tools.
3. Simple, cost effective and fast measurement and/or determination of all necessary (fluid-) parameters like (ambient) air-temperature, humidity, wind speed and direction as well as the radiation heat-flow of the environment of the respective 3D-measurement object into that very object (wall, surface, etc.) with sufficient precision to determine a reliable overall result to be further used by (building-) modeling and simulation tools.
4. Fast, precise and physically correct calculation of each parameter to be used in the simulation model applied (afterwards). These parameters comprise the dimensions of components (walls, surfaces, etc.) as well as the dimensions of the parts within (e.g. windows, doors, dormers, balconies, etc.) and the respective energy characteristics ($P_H$, $R_H$, $C_H$, . . . ) of these components/parts.
5. Simple, cost-effective and fast measurement of all necessary parameters of the measurement object (wall, surface, etc.) to compute the (heat) energy-flow through the surfaces of that very object in amount and direction with sufficient precision to determine a reliable overall result to be further used by some (building-) modeling and simulation tool.
6. Fast, precise and physically correct calculation of each geometry parameter to be used in the simulation models applied (afterwards) like the dimensions of components (walls, surfaces, etc.) as well as the dimension of the parts within (e.g. windows, doors, dormers, balconies, etc.) and the respective energy characteristics ($P_H$, $R_H$, $C_H$, etc.) of these components/parts.
7. Design of a suitable (IT-) system architecture and of an appropriate flow control to perform tasks 1 to 6

To 1) Simple determination of the real 3D-dimensions of a measuring object in all three spatial directions:

Laser distance meters for direct measuring are up to now the most precise and the cheapest way to determine the dimensions of an object, but this method is quite time consuming. Photogrammetry is in general less precise but quite time and cost efficient. The replacement of at least two arbitrary but most exactly measured reference lines in the imaging plane of the object by at least three quite precisely measured object-points in that very imaging plane does resolve this problem. This measurement could be done easily and automatically by three or more built-in (laser) distance meters (e.g. DM1 in FIG. 8). With an in focus arrangement of these distance meters like shown in FIG. 8, there is an easy to calculate trigonometric relation between the real spatial position of the measured object-point and its respective image "pixel-coordinates" in x-/y-pixels. Once these distance meters are not in focus, the distance and spatial inclination dependent parallactic deviation has to be calculated. Having performed these calculations it is possible to assign real x/y/z-coordinates (e.g. in m) to each image pixel and, thus, to determine the absolute spatial dimensions of the measurement plane as well as of the measured object.

To 2) Easy determination of components/parts on or within the 3D-measuring object:

Once the measurement plane according to 1) does have real (image-) pixel coordinates, each subsequent image processing algorithm looking for patterns/structures within the image can render real coordinates to the found components of the measured objects. By this the identification and the precise determination of the dimensions of these very components/parts within the measured object can be almost completely automated. This renders a most considerable time and cost advantage especially for the data collection of large measurement objects like buildings.

To 3) Easy determination of the fluid-parameters of the surroundings of the measuring object:

In general, the measuring objects do not reside in the vacuum but within our air-atmosphere. Thus, it is mandatory to consider the (heat) energy exchange with this surrounding fluid too. Performing this, it is necessary to evaluate the relevant parameters along with the ones for the other energy transport mechanisms. In general this is fairly easy with the specialized measurement systems T1 and T2 (e.g. $T_{air}$, $v_{air}$, humidity, etc.), which do transmit their results, e.g. via radio-link, directly to the overall system for further processing. Doing this the integration of these measurements into the overall system/process can be performed easily and cost effective too.

To 4) Easy evaluation of the radiation parameters characterizing the measuring object's environment:

Once the measurement object's surroundings are either empty or filled with IR-transparent fluids, the radiation part of the total (heat-) energy flow has to be considered too. Due to the Planck radiation law with an energy flow proportional to $T^4$, even small temperature differences render more than 4-times bigger effects compared to any other thermal energy transport mechanism. Thus, it is essential to determine all elements taking part in the energy exchange in a physically correct way. As one can clearly see in FIG. 2 and in FIG. 9 respectively, there are in essence only three really important parts to consider. These parts are the respective object surface element $\Delta A(i,k)$ itself,
the from the surface element $\Delta A(i,k)$ visible (more or less empty) space/sky with $T_{sky}$ and
the from the surface element $\Delta A(i,k)$ visible landscape/environment, consequently the earth with $T_{earth}$.

As one can see easily, the radiation from the sky and from the earth onto the measured object or surface element $\Delta A(i,k)$ respectively is not at all influenced by the measured object itself. These radiation sources thus can be modeled physically correct as ideal black bodies. Exactly this feature does allow for the correct measurement of the total "back-radiation" of the radiation environment of each surface element $\Delta A(i,k)$. A special thermal sensor TK2 or an IR-camera TK2 respectively does perform this measurement as shown in FIG. 9. This easily possible measurement allows to avoid to explicitly set up the in general irresolvable Planck energy-exchange integrals to evaluate the heat exchange of each $\Delta A(i,k)$ and, thus, of the measurement object as a whole with its respective environment. So we do have for the first time a reliable on-site method to measure and evaluate the radiation heat exchange of some object with its respective environment for the general case. This method is by no means limited to this—although for buildings sufficiently precise—most simple break down of the respective (radiation-) environment of a measuring object. Once one uses e.g. a $2\pi$-IR-camera with M×K-pixels to measure the "back-radiation" (e.g. TK2 in FIG. 9) of some measurement object, then its environment and the corresponding energy-exchange can easily be evaluated with this (M×K-) resolution in a physically correct way. This should be sufficiently precise to evaluate even the most complex thermal radiation environments correctly. This example demonstrates as well that the most simple "building approach" with only two "back-radiation temperatures" ($T_{sky}$, $T_{earth}$) already is sufficiently precise for most application scenarios. The same holds once one applies a $T^4$-averaging rule for the measured M×K radiation-temperatures of each solid angle of a $2\pi$-IR-camera used analogical.

To 5) easy measurement of the surface-parameters relevant to determine the energy-flow into the measuring object:

These parameters are (according to the VDI-Wärmeatlas) geometrical ones as well as physical ones. All relevant geometrical parameters (e.g. $L_{char}$, $\alpha_{roof}$, etc.) are determined by the integrated geometry measurement system as described in 1), 2) and in FIG. 8 (DM1 plus evaluation system). The relevant physical parameters like surface temperatures (if applicable roughness, textures, etc.) are measured physically correct by the integrated (thermal) camera TK1 as a thermal image comprising all the $T_{Se}/T_{Si}(i,k)$ needed. Additional measurement values except the ones described in 1) to 4) are not needed to evaluate the (heat) energy-flow into a device under test in a physically correct way.

To 6) Physically correct evaluation of the relevant geometry parameters and energy characteristics ($P_H$, $R_H$, $C_H$, etc.):

The total (heat-) energy flow through a (measuring) surface $I_{Se}/I_{Si}(i,k)$ consists, as shown in detail in the FIGS. 4, 5 and 9, of exactly two components, the in general more important radiation energy-flow $I_{Re}/I_{Ri}(i,k)$, which shows due to Planck's radiation laws a strong incremental dependency (>4×) on the respective temperature differences and the the convective energy-exchange $I_{Le}/I_{Li}(i,k)$ with the ambient fluid (mostly air), which is only linearly dependent on the respective temperature differences.

These two parameters always have to be considered and calculated separately.

Here, under to the preconditions described in 4) above, the radiation part $I_{Re}/I_{Ri}(i,k)$ of the heat energy flow can be computed as a simple sum of the black body radiation of $\Delta A(i,k)$ and of the one of its respective radiation environment (e.g. $T_{sky}$, $T_{earth}$).

Quite a few different application scenarios have to be considered to compute the convection part $I_{Le}/I_{Li}(i,k)$ of the total heat energy-exchange with the ambient fluid (air). Thus, this part has to be computed separately, according to the respective measured values of $T_{air}$, $V_{air}$ (amount/direction) and (vertical) inclination (e.g. $\alpha_{roof}$) of the measuring plane as well as the geometry ($\Leftrightarrow_{char}$). Together with some additional requirements for a laminar or a turbulent fluid flow at the device under test, the evaluation system has to respect these criteria as automatically as possible (see FIG. 9). The necessary case-by-case analysis and the selection of the appropriate calculation formulas (see FIG. 9) for the applicable Nusselt-, Raleigh, Grasshof-, Prandtl- and Reynold-numbers too have to be determined in a physically correct way by the automatic evaluation system. This is by no means an easy task, keeping in mind the complexity and the large multitude of the different cases to be considered according to the VDI-Warmeatlas 2012. This requires great care and a lot of expertise in physics to be able to develop an appropriate evaluation system.

To 7) Flow control and system architecture:

The measurement readings of the respective surfaces of the device under test and the readings for the relevant backscattered radiation should be made at the same time whenever possible. The readings for the ambient air or fluid parameters respectively mostly do become more precise by temporal averaging. Here an averaging interval larger than the one needed for the thermography of the measuring object does render in general more reliable readings.

Following the presented invention, the geometry results are always obtained together with the respective readings for the temperatures and for the environmental parameters while performing the thermography. Thus, they are all readily available once they are needed for the computation. This simplifies considerably the overall system architecture and the flow control. They just have to ensure that the "slower" data, generally the "averaged values" of the surrounding fluids, could be added appropriately and automatically afterwards to the other data acquired.

An (IT-) workstation with a complete evaluation, analysis and reporting SW-package does complete the proposed system architecture. This overall system does offer a most comfortable way to a fast, complete and quite cost-effective thermal analysis for almost arbitrary 3D measuring objects (see FIG. 10).

Further advantages and designs of the invention unfold from the description presented and the figures attached.

It is obvious, that the preceding and the following characteristics could not only be used in the combinations mentioned here, but also in other combinations or even as stand alone solutions without leaving the framework of the very invention at hand.

In the following the invention is presented by means of execution examples shown in FIGS. 1-10 and it will be explained in more detail referring to those figures.

Figure 2:
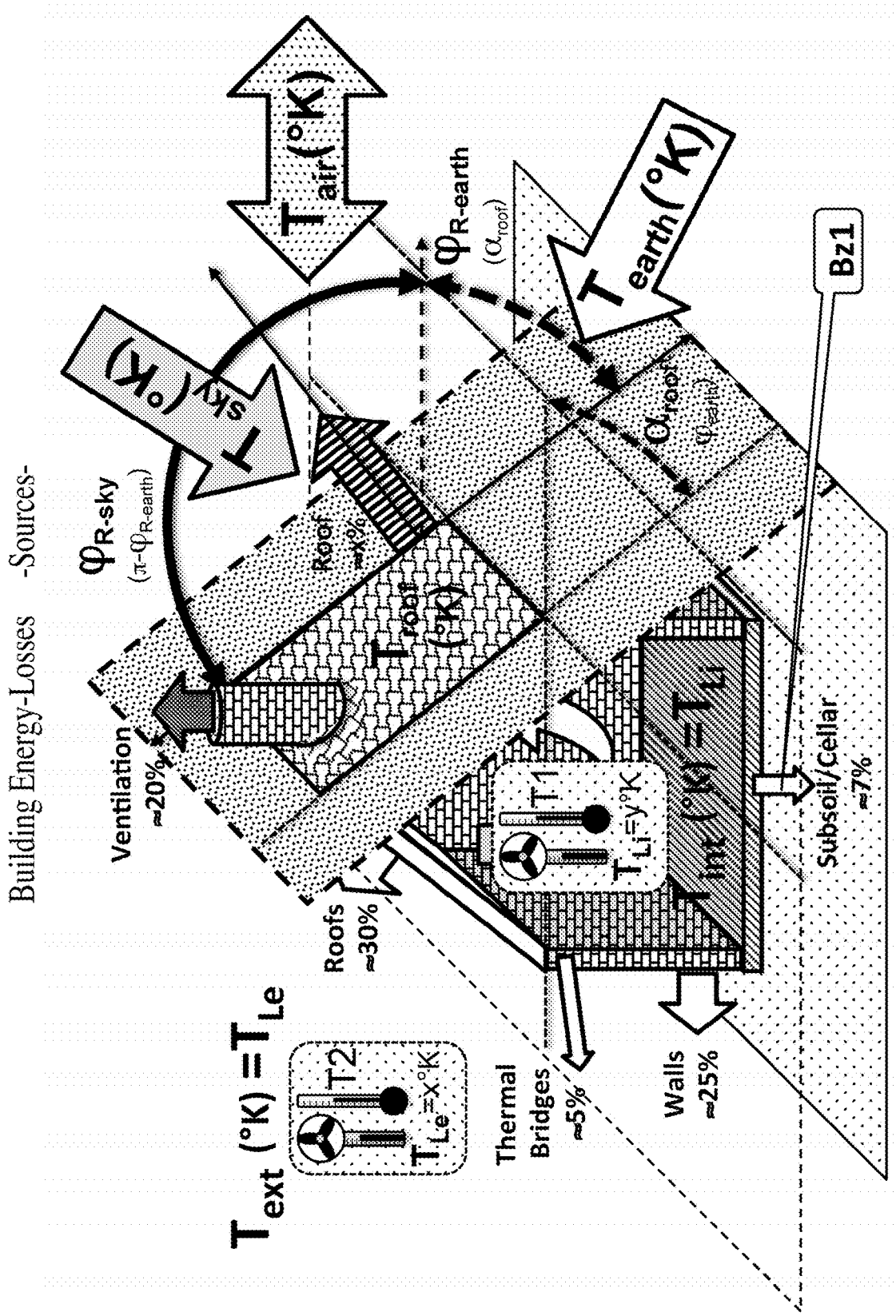
FIG. 2 shows the physical sources of the energy losses of buildings.
Figure 3:
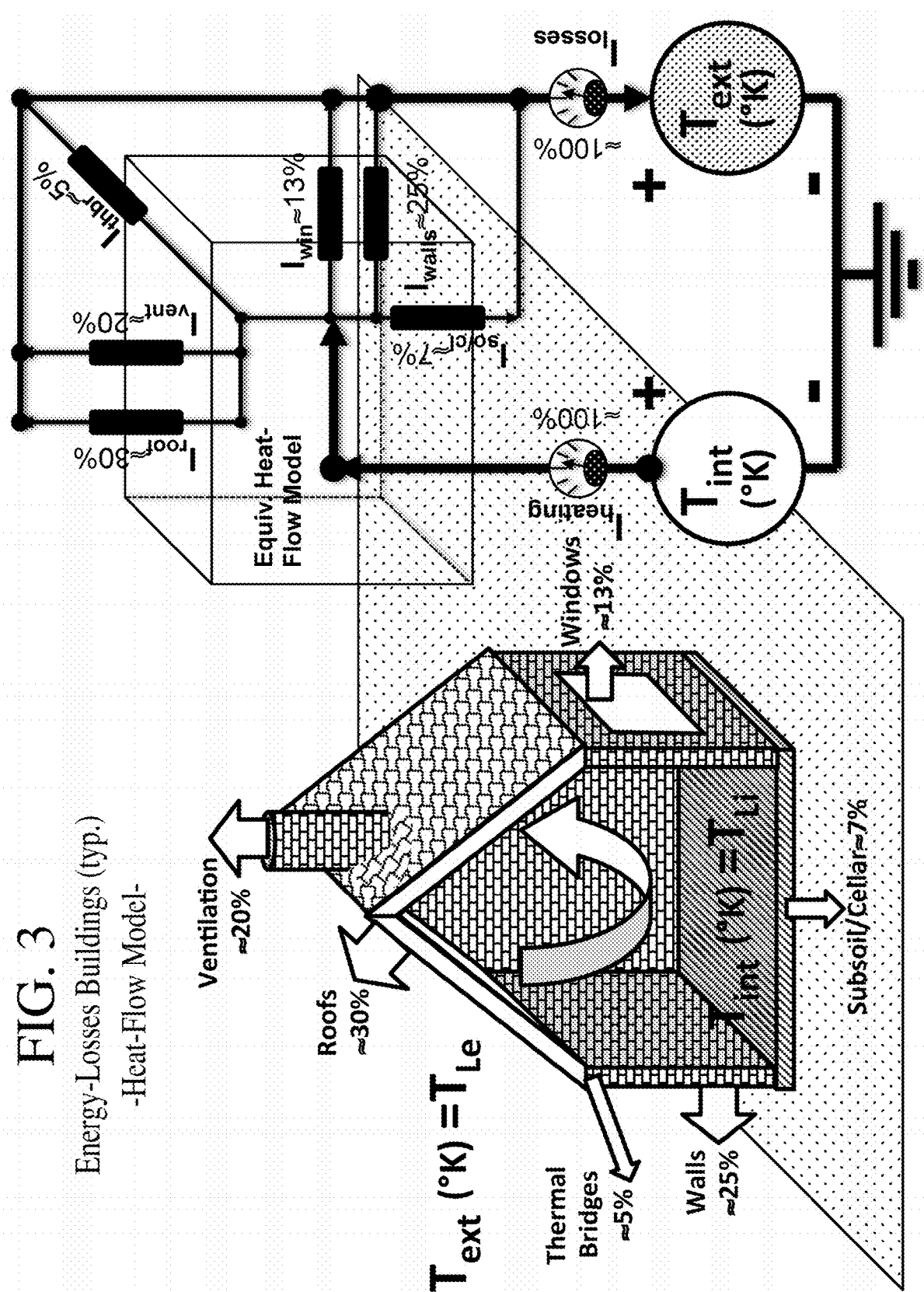
FIG. 3 shows the energy losses of buildings and the corresponding heat-flow model.
Figure 4:
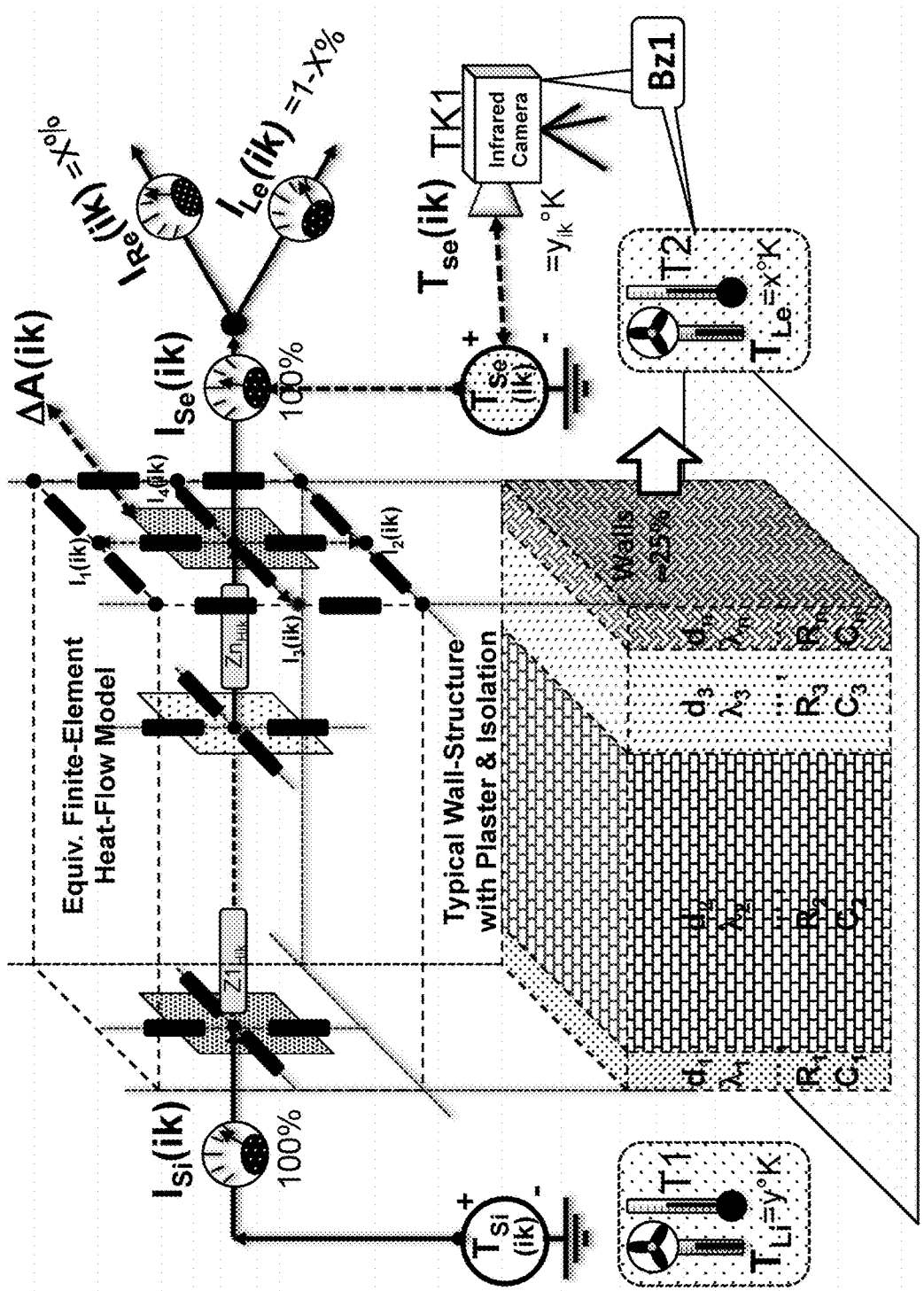
FIG. 4 shows the measuring physics with the help of the corresponding heat-flow and the corresponding finite-element model.
Figure 5:
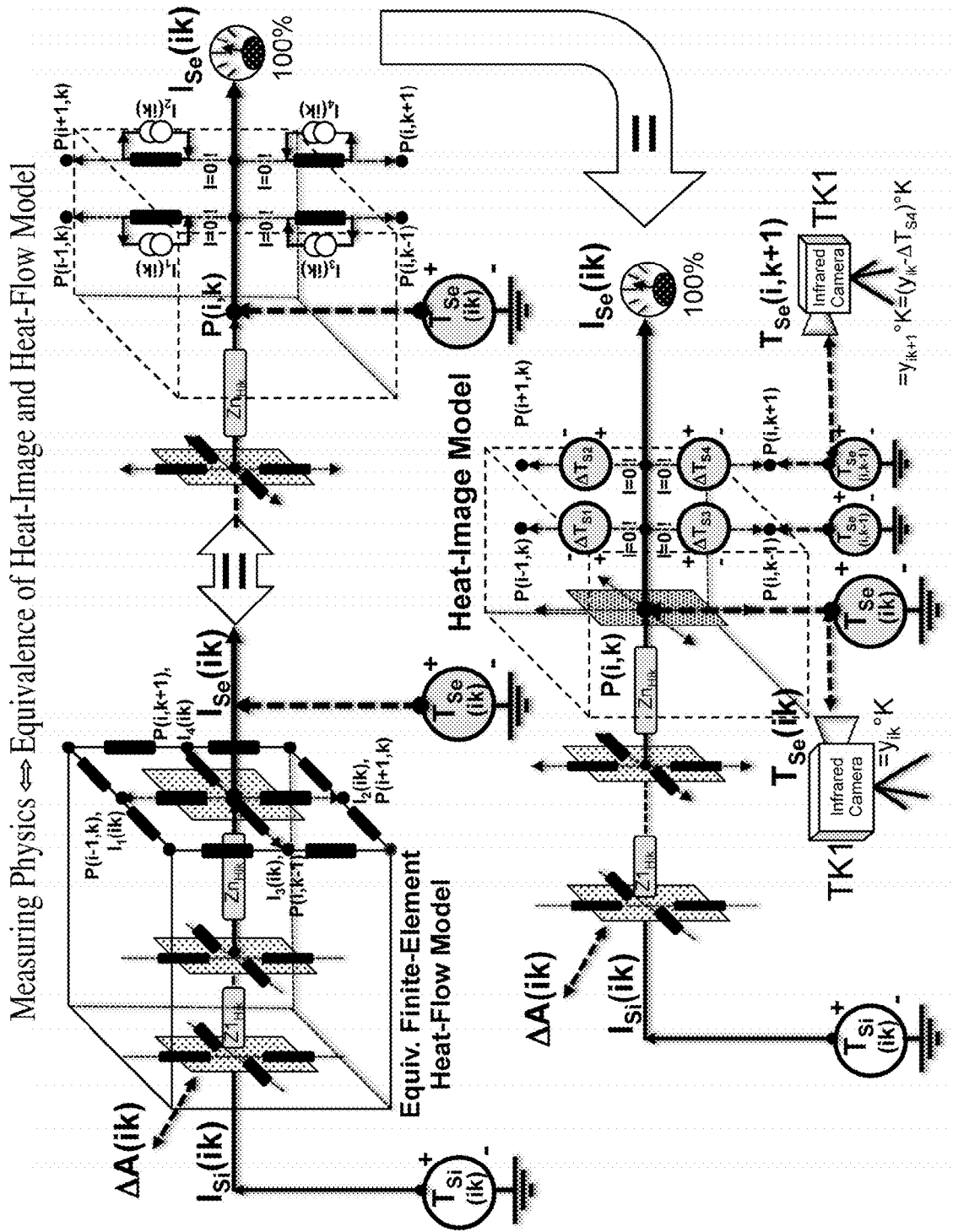
FIG. 5 shows the measuring physics with the help of the equivalent heat-flow and thermal-image model.
Figure 6:
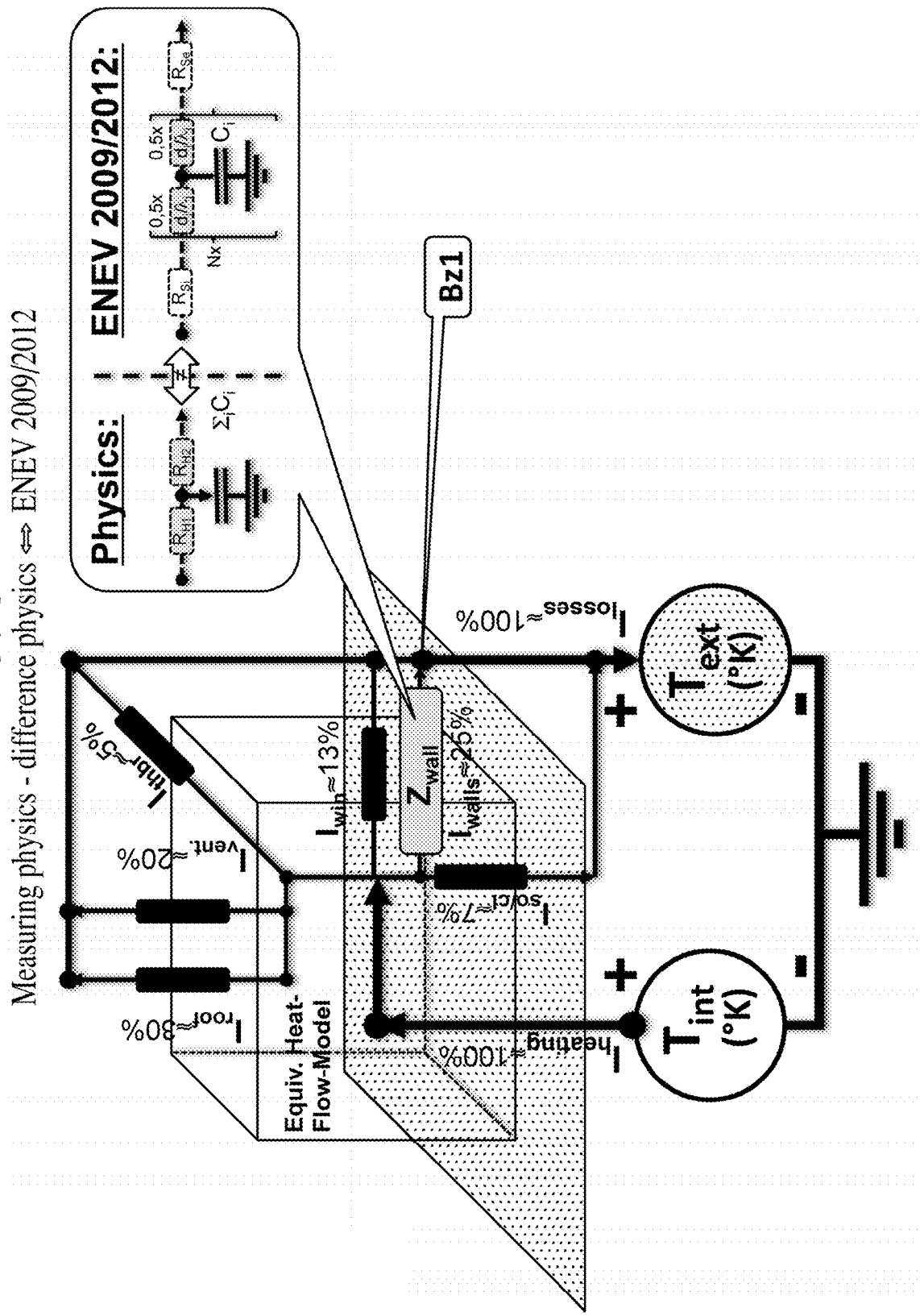
FIG. 6 shows the differences of (heat-) measuring physics to the ENEV 2009/20012 modeling standards.

The invention is now described in more detail by means of several execution examples shown in the FIGS. 1 to 10. These figures do show here (for the first time) examples and details for the physical correctness of the measuring method (FIG. 1 to 3 and FIG. 9) as well as for the correctness of the modeling applied (FIGS. 4 to 6). The FIGS. 7 to 9 do show the invention's evaluation procedures. FIG. 2 and FIGS. 8 to 10 respectively do show measurement and calculation methods according to the invention as well as the consequential overall system architecture (FIG. 10) of the integrated measuring system and of the arrangement necessary to execute the process.

Figure 1:
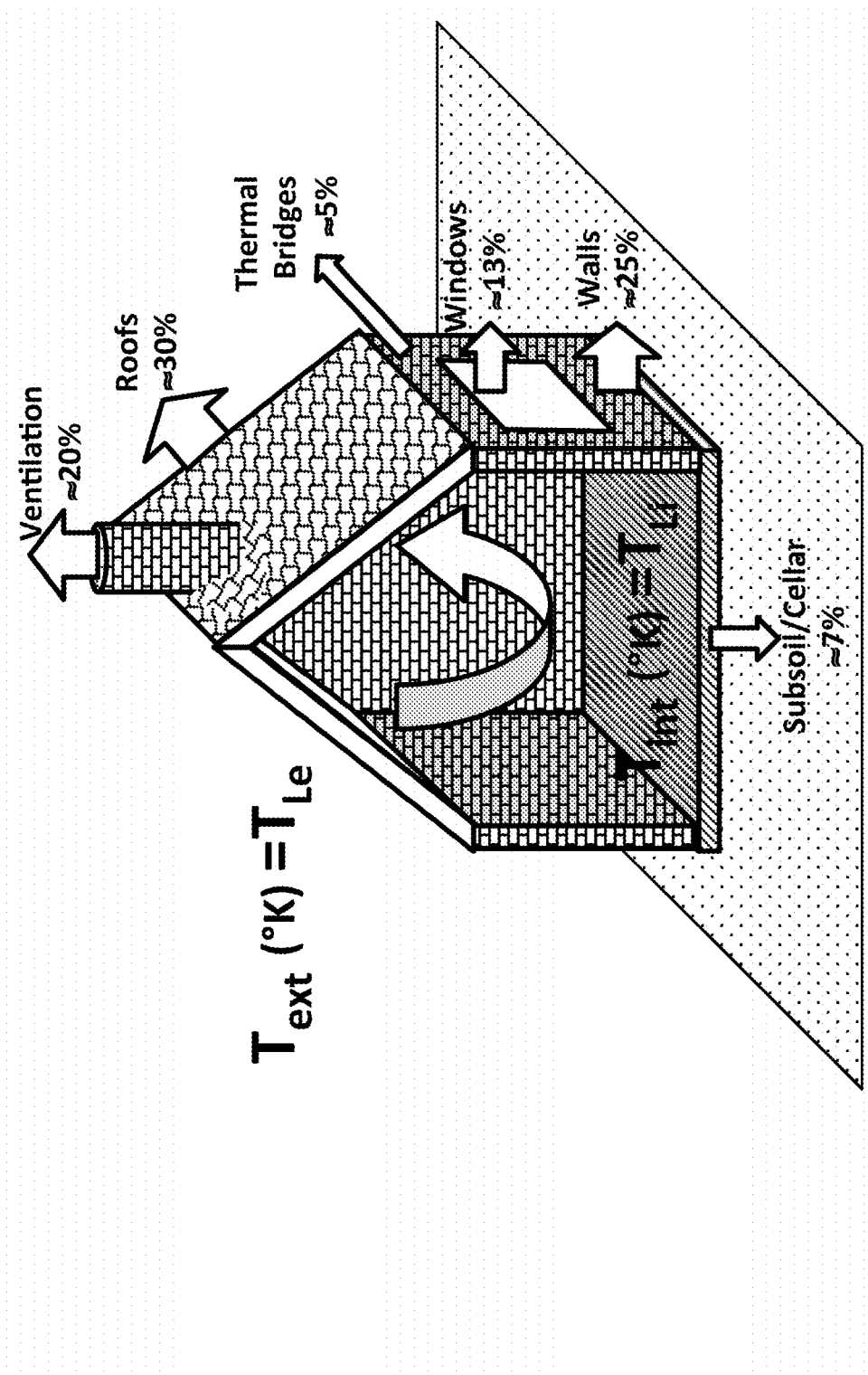
FIG. 1 shows typical losses of a family home.

FIGS. 1 to 3 do demonstrate the (heat-) energy exchange mechanism of a measuring object (here a family home) with its respective surroundings. FIG. 2 does demonstrate the decisive drivers/parameters and FIG. 3 does demonstrate a physical correct modeling of this method. On such a basis FIG. 9 demonstrates finally how the measurement and calculation of physically correct values/results is done.

FIGS. 4 to 6 demonstrate in a step by step way, why this modeling of (heat-) energy transport mechanism is a physically correct one (FIGS. 4 and 5) and why this model does represent the thermal image measuring results and the derived (heat-) energy flows in a correct way. FIG. 6 does demonstrate why the current standards and definitions of the ENEV and the DIN-EN-ISO 6946 respectively do not represent correctly the physical reality and, thus, why these standards are not suitable to base a measuring scheme on.

Figure 7:
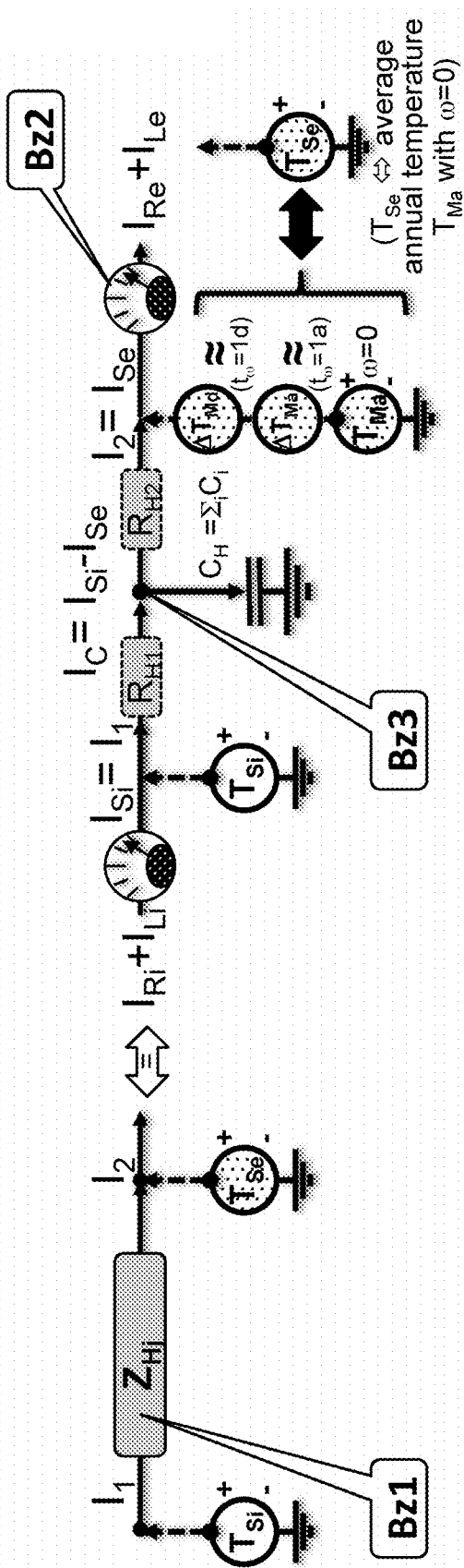
FIG. 7 shows the measuring physics by means of computing the energy characteristics.
Figure 8:
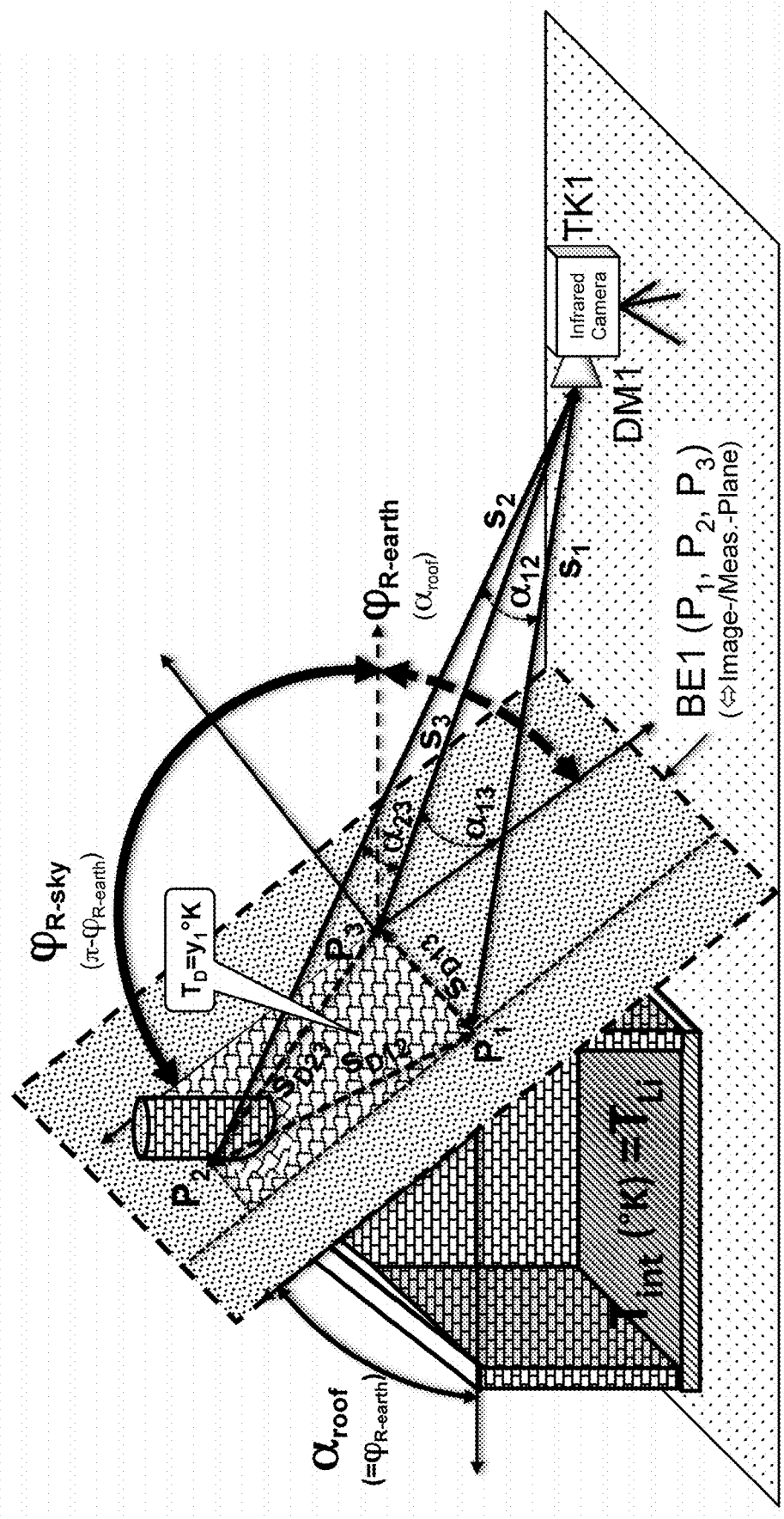
FIG. 8 shows the measuring physics by means of computing building element dimensions/geometry.
Figure 9:
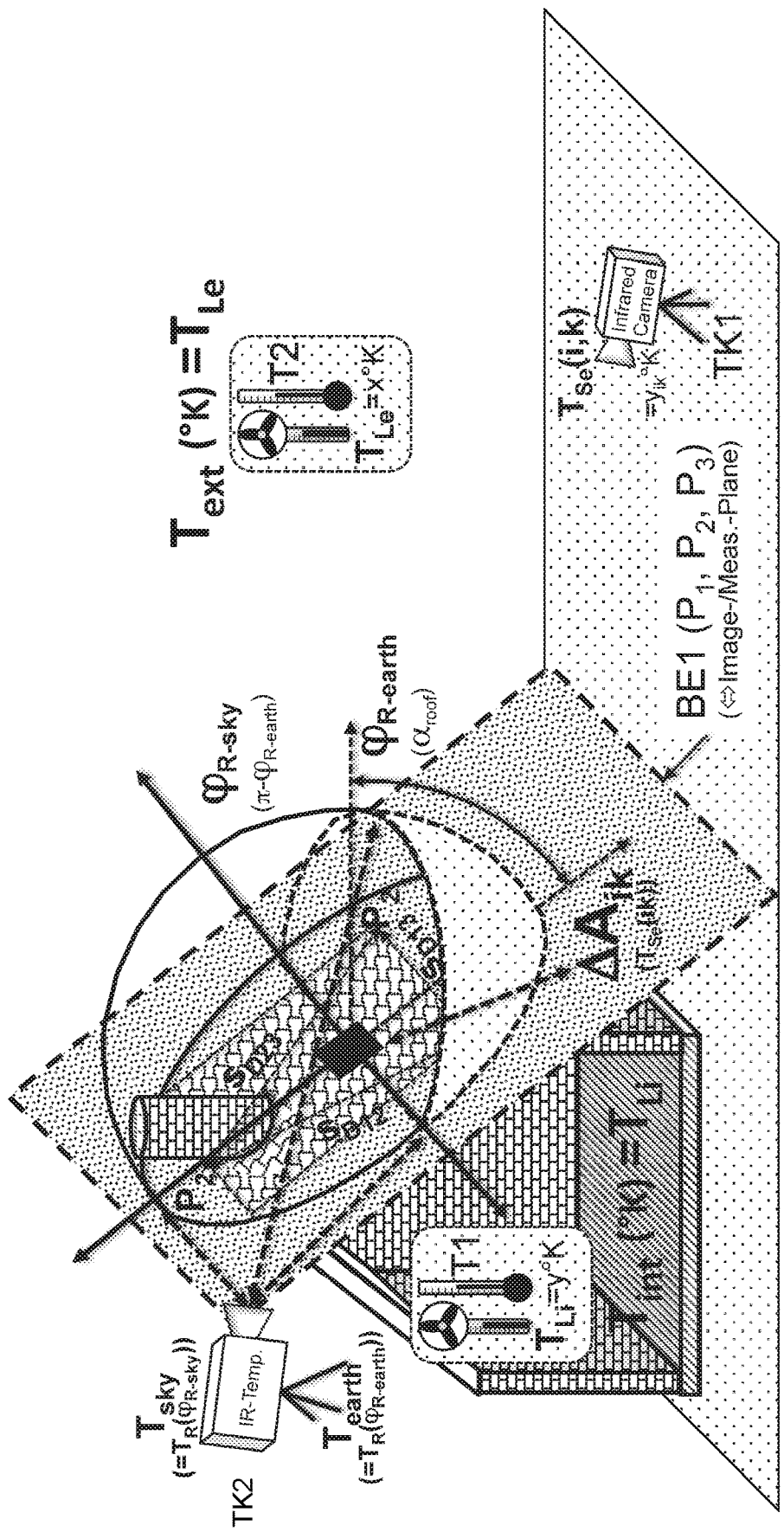
FIG. 9 shows the measuring physics by means of computing the (heat) energy-flows.

The calculation of the energy characteristics ($R_H$, $C_H$, etc.) according to the invention is shown in the FIGS. 7 to 9. Here FIG. 7 demonstrates the physically correct computation of the energy characteristics ($R_H$, $C_H$, etc.) based upon, if necessary, even several (energy-) flow measurements. FIGS. 8 and 9 demonstrate how, based upon different measurements, the necessary geometry information (FIG. 8) as well as the resulting energy flows (FIG. 9) can be determined.

FIGS. 1 to 10:

FIG. 1 demonstrates with a schematic example the typical sources and values of the (heat-) energy losses of an average (one) family home (values are typical for France).

FIG. 2 demonstrates as a schematic diagram all three energy transport mechanisms through the respective surfaces shown in FIG. 1. These heat transfer mechanisms are:
1. The heat conduction to the ground with $T_{soil} = x_1°$ K,
2. The convective heating/cooling by surrounding fluids, here air with $T_{air} = x_2°$ K,
3. The radiation exchange of the respective surfaces with their relevant $2\pi$-hemispheres. Here the radiation temperatures of the sky with $T_{sky} = x_3°$ K and of the surrounding landscape with $T_{earth} = x_4°$ K are of special importance for buildings.

Bz1: In general heat-conduction/-losses into the subsoil can only be determined indirectly due to missing (substrate) temperatures and missing knowledge about the substrate materials ($T_{soil}$, $\lambda_i$, $d_i$, etc.).

FIG. 3 shows the equivalent heat-flow model corresponding to the typical heat-losses of FIG. 1. In this model each wall/surface enclosing a room is represented by some equivalent (thermal) resistance or impedance (due to the inevitable thermal capacities of each wall component) to be more precise. In addition all wall-/surface-temperatures are represented by their equivalent voltages (e.g. $T_{int} = U(T_{int})$). For this reason each (electrical) current in any impedance of the heat-flow model corresponds directly to the very heat transferred through its respective wall/surface-element in the real world in value and direction. The laws of conservation of energy are thus represented by the Kirchhoff-node and -mesh rules for currents and voltages in electrical networks.

FIG. 4 shows schematically, as a finite-element unit cell, how a typical real wall structure is mapped into an equivalent finite-element heat-flow model. In this model the (thermal) energy-flows/-currents do only flow through the in general material dependent impedances between any two of the six neighboring nodes $(i\pm1, k\pm1, z)$ and $(i, k, z\pm1)$ of each node $(i,k,z)$ of that very model. The total (heat-) flow/current which enters and/or exits any wall/surface of the model is, as can clearly be seen in FIG. 4, the sum of all $I_{Si}(i,k,z_1)$ and $I_{Se}(i,k,z_N)$ respectively of any modeled surface element with the temperatures/voltages $T_{Si}(i,k,z_1)$ and $T_{Se}(i,k,z_N)$ respectively, which can be measured by a corresponding IR-camera. This thermal energy-flow/-current is then absorbed by the relevant radiation environment ($\Leftrightarrow I_{Re}(i,k)$ and/or $I_{Ri}(i,k)$) and by the relevant convection environment ($\Leftrightarrow I_{Le}(i,k)$ and/or $I_{Li}(i,k)$). Due to the energy conservation laws the currents $I_{Si}(i,k,z_1)$ and $I_{Se}(i,k,z_N)$ are at any time equal to the sum of the radiation and convection energy flows entering/leaving the respective surfaces at point $(i,k,z_1/z_N)$. Thus, their amount and direction becomes directly deducible from the measurement results (IR-image and environmental parameters).

Bz1: Measurement of the Losses $\Leftrightarrow \Sigma_{ik} I_{Se}(i,k)$:

TK1 $\Leftrightarrow (T_{S11}, T_{S12}, \ldots, T_{S1n}, \ldots, T_{Smn})$

Losses $\Leftrightarrow \Sigma_{ik} I_{Se}(i,k)$ due to $I_j(i,k) = 0$!

$I_{Se}(i,k) = I_{Re}(i,k) + I_{Le}(i,k)$ $I_{Re}(i,k) = F(T_{Se}(i,k), T_{Re}(env.), \Delta A)$ $T_{Re}(env.) = F(T_{sky}, T_{earth})$ $I_{Le}(i,k) = F(T_{Se}(i,k), T_{Le}, \alpha_k, L_{char}, \Delta A)$ FIG. 5 demonstrates in three steps the transformation of a finite-element heat-flow model equivalent to some arbitrary wall-/surface-structure to an equally equivalent (finite-element) thermal-image model. Here, the measured temperature/voltage differences between any two neighboring surface points $(i,k,z_K)$ and $(j,l,z_K)$ are replaced by controlled current sources with equivalent (impedance-) currents between these very (surface-) points (second transformation step in FIG. 5). According to the Kirchhoff-laws ($\Leftrightarrow$ energy conservation laws) it is possible to replace these devices by zero-current voltage-sources with the voltages equivalent to the measured temperature differences $\Delta T_{Sk}$ between these very two surface points $P(i,k,z_1/z_N)$ and $P(j,l,z_1/z_N)$ respectively. Since all other currents in/out of the wall/surface do vanish, only the currents $I_{Se}(i,k)$ and $I_{Si}(i,k)$ remain. They, in turn, are only dependent on the respective surface temperature $T_{Se}(i,k)$ and $T_{Si}(i,k)$ and, thus, they represent the total (heat-) energy flow into/out of the wall/surface at the respective location $P(i,k,z_1/z_N)$ of that very wall/surface. This energy-flow thus can, better ought to be measured contact-free by a thermal camera, cause in general any other method does distort considerably the results.

FIG. 6 demonstrates the differences between the physically correct modeling/measurement of (heat) energy-flows $I_{Se}/I_{Si}$ through wall-/component-surfaces according to this invention and the DIN-EN-ISO 6946 ($\Leftrightarrow$ ENEV 2009/2012) standards applied in almost any commercial building simulation tool. These tools/models use the (inside/outside) ambient air temperature $T_{Le}/T_{Li}$ as the only environmental parameter, which does make them completely inapplicable for the measurement of (thermal) resistances and impedances of any component/surface. The (standard) $R_{Se}$-/$R_{Si}$-values used there do not at all represent a physical reality and, thus, they cannot be used for measurement purposes. They just serve to compensate the inevitable errors due to the simplifications (e.g. no "radiation climate" or no "radiation environment") made in their models in order to still achieve reliable simulation results on a monthly-/annual-average basis.

Bz1: Computation of Thermal Resistances:

Physics Versus ENEV 2009:

$R_H = R_{H1} + R_{H2} \neq R_{Si} + \Sigma_i (d_i/\lambda_i) + R_{se}$ $C_H = \Sigma_i C_i = \Sigma_i C_i$ $I_{RH} = I_{Se} = I_{Re} + I_{Le} \neq (T_{Li} - T_{Le})/R_H$ $T_{int} = F(T_{Ri}, T_{Li}) \neq T_{Li}$ $T_{ext} = F(T_{Re}, T_{Le}) \neq T_{Le}$ FIG. 7 demonstrates the physically correct computation of a (thermal) impedance ($\Leftrightarrow$ thermal resistance $R_H = R_{H1} + R_{H2}$ with its corresponding thermal capacity $C_H$ and thermal inertia $\tau_H$ respectively) of some component or its respective surface according to the present invention and based on the respective measured surface temperatures $T_{Se}$ and $T_{Si}$ respectively. The shown quadrupole equivalent circuit is physically correct in contrast to the ENEV-one from FIG. 6. Cause the ambient temperature inside $T_{Si}$ in general can be assumed to be constant as in any commercial simulation tool, the variable external temperature $T_{Se}$ with the two major cycles day ($\omega = 2\pi*24$ h) and year ($\omega = 2\pi*365*24$ h) does "see" the parallel circuit $R_{H1}$ and $C_H$ with the time constant $\tau_H$ as the effective "inertia" of that very component and its surface respectively. Once the measurement interval $\Delta t$ is small compared to this time constant $\tau_H$, it is possible, according to the quadrupole theory, to even measure and determine these "hidden" values ($R_{H1}$, $R_{H2}$, $C_H$, $\tau_H$) at least with sufficient precision. It is a further advantage of the measuring method according to this invention, that in the static (DC-) case with ($\omega=0$) the $R_H$-Values measured from the outside must be the same as the ones measured from the inside although the measurement conditions vary quite dramatically in general. By this on-site measurement-error checking is for the first time possible or it is at least greatly facilitated.

Bz1:

$$Z_{Hj} = \begin{cases} AC(\omega \neq 0) : \dfrac{R_{H2} + R_{H1}}{(1 + 2\pi j * R_{H1} C_H / t_H)} = \dfrac{R_{H2} + R_{H1}}{(1 + 2\pi j * \tau_H / t_H)} \\ DC(\omega = 0) : R_{H1} + R_{H2} = A_j * \Sigma_i \left(\dfrac{d_{1i}}{l_{1i}}\right) + A_j * \Sigma_k \left(\dfrac{d_{2k}}{l_{2k}}\right) \end{cases}$$

with $\tau_H = R_{H1} C_H$

Bz2:

$$I_{Se} = \begin{cases} AC(\omega \neq 0) : I_{Re} + I_{Le} = I_{Si} - I_C \neq I_{Si} = I_{Ri} + I_{Li} \\ DC(\omega = 0) : I_{Re} + I_{Le} = I_{Si} = I_{Ri} + I_{Li} \end{cases}$$

Bz3:

$I_C(t_i) = I_{Si}(t_i) - I_{Se}(t_i)$ for all $\omega$, $R_{H1} \approx \Delta U_C / \Delta I_{Si} = ((T_{Se}(t_{i+1}) - T_{Se}(t_i)) -$ $(R_{H2} * (I_{Se}(t_{i+1}) - I_{Se}(t_i))) / (I_{Si}(t_{i+1}) - I_{Si}(t_i))$ $R_{H2} = Z_{Hj}(DC) - R_{H1}$ $C_H \approx \Delta Q_C / \Delta U_C = \Delta t * (I_C(t_{i+1}) + I_C(t_i)) /$ $(2 * ((T_{Se}(t_{i+1}) - T_{Se}(t_i)) - R_{H2} * (I_{Se}(t_{i+1}) - I_{Se}(t_i)))$ For all $\Delta t = t_{i+1} - t_i$ and $\Delta t \ll \tau_H$ FIG. 8 shows the trigonometrically correct measurement and evaluation of the component geometry demonstrated at the example of an inclined roof surface according to the invention. Together with the measurement of the surface temperatures $T_{Se}(i,k)$ by the thermal camera TK1 (see FIG. 9) the geometry of the very surface (plane) under test is determined too by the camera integrated distance metering tool DM1 (see FIG. 10). To perform this, a minimum of three laser distance measurements ($S_1$, $S_2$, $S_3$) with fixed and known angles ($\alpha_{12}$, $\alpha_{13}$, $\alpha_{23}$) are used which do characterize trigonometry and the relative position in space (inclination $\alpha_{roof}$ either to the horizontal or $\alpha_{camera}$ to the camera-image plane) of the measurement-/roof-plane BE1 (P1,P2,P3) completely. This in turn allows to assign real dimensions/coordinates (e.g. in m) to BE1 (P1,P2,P3). With this information the "footprint" AA of each camera pixel is well defined in image coordinates (i,k) as well as in real ($m^2$) coordinates (x,y,z). Performing this, the surface element $\Delta A(i,k)$ as well as the whole measuring surface with all its features is completely determined and measured (e.g. in m). Within this now completely characterized camera image of TK1, some suitable image-processing algorithms can automatically look for enclosed structures/objects to be (thermally) analyzed and characterized during or after the measurement.

FIG. 9 demonstrates the physically correct computation of the $I_{Se}$-/$I_{Si}$-values according to the invention presented at the general example of an inclined component plane (e.g. roof, . . . ). To this end and according to the invention presented, the (thermal) camera TK1 measures the surface temperature $T_{Se}(i,k)$ of each surface element $\Delta A(i,k)$, the IR-sensor/-camera TK2 measures the respective $2\pi$-hemisphere radiation relevant to this very surface element $\Delta A(i,k)$, T1 does meter the ambient (air-) parameters ($T_{Li}$, $v_{Le}$, . . . ) of the respective enclosed room (here a family home) and T2 does meter the ambient (air-) parameters ($T_{Le}$, $v_{Le}$, . . . ) of the respective (outside) world. These measurements should be performed simultaneously, whenever possible. According to the invention presented, one can assume that the hemisphere radiation ($T_{sky}$, $T_{earth}$) measured by TK2 is at least in some first order approximation independent from the location of the surface element $\Delta A(i,k)$ inside the measuring plane (BE1). Assuming this, one can now calculate the currents $I_{Se}/I_{Si}$ with sufficient precision using a simple formula for the first time! Thus, it can be avoided to set up and resolve the corresponding extremely complicated Planck radiation-law integrals, which are unsolvable for the general case. Doing this, the respective radiation parts of $I_{Se}/I_{Si}$ can now be computed in a simple way. For the convection part of $I_{Se}/I_{Si}$ all necessary information ($T_{air}$, $v_{air}$, $L_{char}$, $\alpha_{roof}$, etc.) is now available too. Thus, using known fluid dynamics formulas ($\Leftrightarrow$VDI-Wärmeatlas), these convection currents can be calculated with sufficient precision too. Thereby $I_{Se}/I_{Si}$ is determined completely. The energy characteristics of the respective component/surface can now be computed from these results terminally (see FIG. 7).

Figure 10:
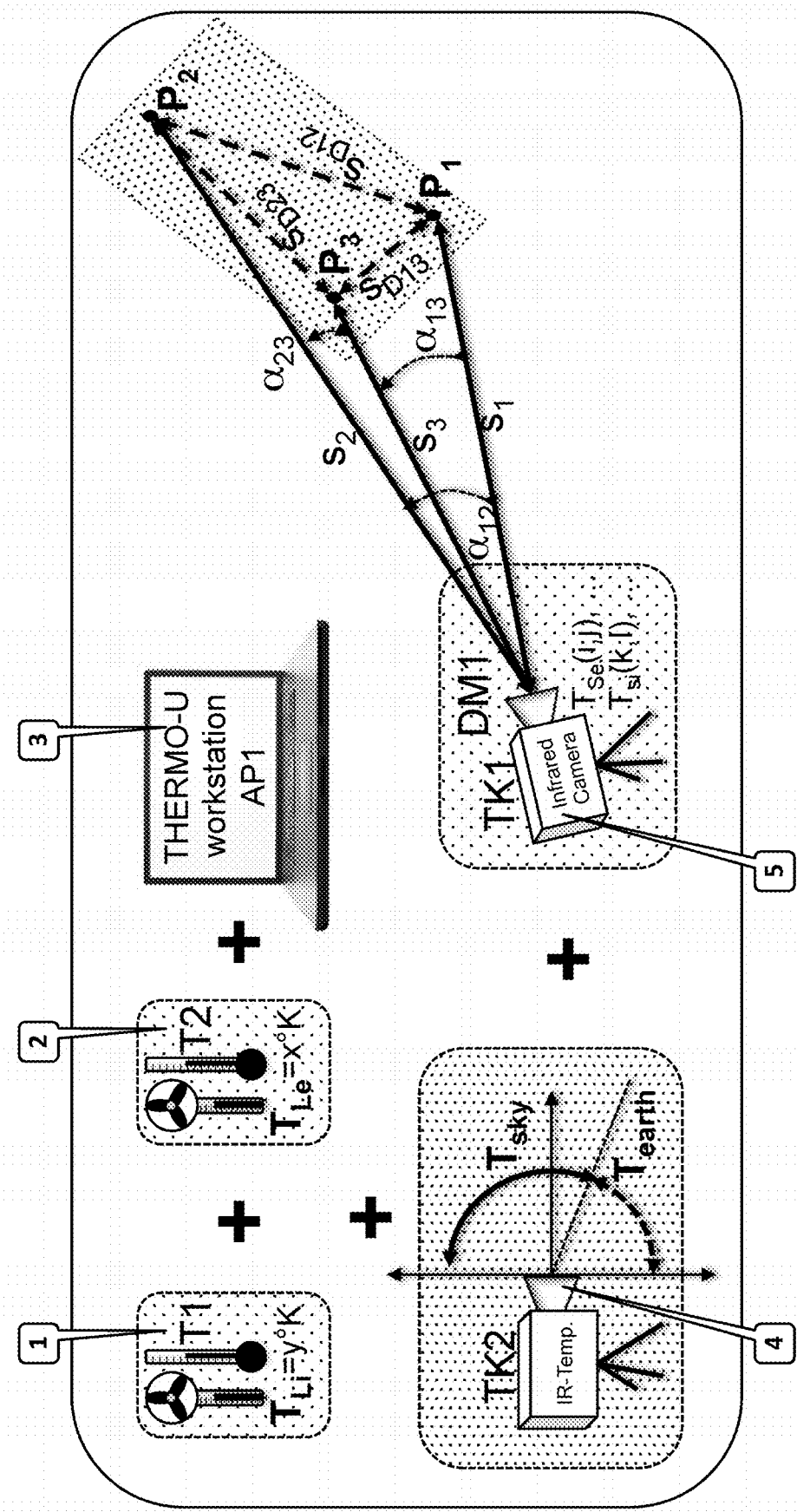
FIG. 10 shows the overall system design to measure energy characteristics.

FIG. 10 shows the architecture of the integrated overall system with the minimum set of gauges for the measurement/determination of all energy and geometry characteristics ($U_H/R_H$, $C_H/\tau_H$, component dimensions, etc.) of a building and/or a component according to the invention. This (minimum) set consists of a (thermal) camera TK1 with an integrated distance meter unit DM1 and a $2\pi$-hemisphere radiation-checking device TK2, which must be at least able to measure separately the two hemispheres sky and earth with an arbitrary spatial angle $\varphi_{earth}$. Further, a minimum of two environmental measuring devices T1 and T2, whenever possible equipped with some radio data link, are necessary to measure the inside and outside fluid temperatures (here mostly air-temperatures) $T_{Li}/T_{Le}$, the flow speeds $v_{Li}/v_{Le}$, the humidity and other parameters once needed. A (IT-) workstation AP1 equipped with the complete THERMO-U evaluation-SW and other tools if necessary to comfortably edit and evaluate the acquired (thermal) image information and to edit significant reports.

To conclude an abstract on possible designs of the invention is given.

A method for the measurement and calculation of thermal energy losses $P_H$, thermal resistances $R_H$, effective thermal capacities $C_H$ and the corresponding thermal time constants $\tau_H$ of surfaces of devices, machines, buildings, etc. is presented, which allows to measure contact-free and to calculate simultaneously all convection and radiation (heat-) energy losses through the respective surfaces of some measuring object from the inside as well as from the outside.

In the case of a partial integration/covering of the measuring object in/by an unknown conduction material—here called building soil—the conduction (heat) energy-losses into the building soil can be determined too corresponding to claim 1 by subtracting the results of an integral measurement from the inside from the respective result of an integral measurement performed from the outside.

The respective surface temperatures of each surface element are measured contact-free via a (thermal) camera/sensor TK1 where its respective real spatial position and geometry is measured and computed simultaneously by the (camera-) integrated geometry measurement system DM1.

Further the radiation energy input from the environment of the measuring object into each measured surface element is determined via a 2π-hemisphere radiation sensor TK2 according to a minimum of two selectable spatial angles ($\varphi_{sky}$, $\varphi_{earth}$) separately and together with the measurement of the surface temperatures of the respective surface elements.

In addition this 2π-hemisphere radiation sensor TK2 can segment the measurement hemisphere in M×K equal/different solid angles (2π-hemisphere thermal camera), measure each solid angles separately and pass down the respective radiation temperatures proportionately to the integrated measuring system.

Furthermore for the indoor and outdoor fluid parameter measurement respectively at least one separate integrated fluid parameter sensor, which is integrated into the overall measuring system via (RC-) communication link, does measure the necessary parameters like ambient (air-) temperatures, flow speeds (value, direction), humidity, etc. for the computation of the respective convection (heat) energy-losses indoors and outdoors at the same time and which does transmit the respective results either as actual values or as time-average values to the integrated measurement system.

The camera-integrated geometry measurement system does provide the overall image of the measuring (thermal) camera with real x/y/z-coordinates (e.g. in m) by using three measuring beams ($S_1$, $S_2$, $S_3$) with known mutual angles $\beta_{12}$, $\alpha_{13}$, $\beta_{12}$) which in turn determine three points ($P_1$, $P_2$, $P_3$) on the measuring plane BE1 in their relative positions and their distances to the camera image plane. Using these positions, simple trigonometric calculations allow to assign real physical x/y/z-dimension (e.g. in m) to each image pixel of the device under test and, thus, to the whole image of the measuring camera as well.

The camera integrated geometry measurement system can also use together with the temperature measurement more than three measuring beams ($S_1$, $S_2$, etc.) with known angles one to another to allow the assignment of real 3D coordinates (x, y, z) or other 3D coordinate-systems (e.g. cylindrical coordinates) via simple trigonometric calculations and, thus, to adapt the geometry measurement also to bent surfaces by using selectable geometry models.

A special feature of this method is the option to connect each part of the integrated measurement system with a wireless communication link with each other and with a computer workstation (AP1) and that by this all physical and geometrical information necessary for an evaluation could be made available in the measurement TK1 camera as well as at the workstation AP1 immediately after the measurement has been done.

Furthermore a computer program and a SW computer program product is presented, which can be loaded directly into a computer memory and which comprises pieces of SW to execute the method presented to compute (heat) energy-losses, thermal resistances and thermal capacities as described in this paper The invention at hand exploits the (physical) fact, that any (heat) energy-flow $I_E$ through some surface/envelope $A_{12}$ (m1⇔m2) of some element (material m1) into its respective environment (material m2) is solely dependent on measurable material and environmental parameters respectively, which will be described in detail in the following:

$$I_E(A_{12}) = I_{Em1} = I_{Em2} = I_{cdt} + I_{cnv} + I_{rad}$$

Where:

$$I_{cdt} = A_{12} * [d_{m2}/\lambda_{m2}] * (T_s(x, y) - T_{m2}(env.))$$

with $T_{m2}(env.) = T_{fld}(env.)$;

$$I_{cnv} = A_{12} * \alpha_k(\gamma_s, \varnothing(T_s), L_{char}(A_{12}), E_{mat}(fld), v_{fld}) * (T_s(x, y) - T_{fld}(env.));$$

$$I_{rad} = \int_{A12} [C_{12}(x, y, 2\pi - hem(A_{12}(x, y))) * \\ (T_s^4(x, y) - T_{rad}^4(2\pi - hem(A_{12}(x, y))))]$$

with $T_{rad}(2\pi - hem(A_{12})) \neq T_{fld}(env.)$;

The measurement and determination of the temperature dependency of the different $I_E(A_{12})$-components is becoming increasingly complicated. Thus, approximations have to be applied such that the technique remains applicable for practical on-site measurement problems. On top of that, the thermal inertia and the thermal capacity of the devices under test have to be considered too. This leads to complex thermal resistances (⇔ heat-flow model), which can only be measured via a time series analysis.

For most measurements and especially for building measurements, the standard environment is the fluid air. Thus, the conduction part $I_{cdt}$ of $I_E(A_{12})$ vanishes in general and only the convection $I_{cnv}$ and the radiation part $I_{rad}$ of $I_E(A_{12})$ have to be considered.

This simplifies the measurement task considerably, cause the convection part $I_{cnv}$ is only linearly dependent on the surface coefficient $\alpha_k$ and the easy to measure temperature difference $T_S(x,y)-T_{fld}(env.)$. The surface coefficient $\alpha_k$ in turn, does only depend on the respective surface parameters like area $A_{12}$, geometry ($\gamma_s$, $\Delta x_{12}$, $\Delta y_{12}$, ...), average surface temperature $\varnothing(T_S)$ as well as on the (largely constant) material parameters of the surrounding fluid (in general air).

It is essential for the invented method to measure these parameters at the same time and automatically. With a case-by-case modeling the corresponding energy-flows (e.g. $I_{cnv}$, $I_{rad}$) can then be determined too in a physically correct way. Up to our knowledge, no other method performs these tasks this way.

However, the determination of the radiation part $I_{rad}$ of the energy-flow $I_E(A_{12})$ is much more complex and there are no solutions for the general case available. Formulas to compute $I_{rad}$ do only exist for some very special cases and geometries. This is caused by the fact, that one has to consider both, the back-radiation of the complete 2π-hemisphere of each element/surface under test $A_{12}$ (x,y) as well as the emitted radiation of that very surface-element $A_{12}$ (x,y) into its respective environment with the radiation temperature $T_S(x,y)$. Without simplifications and an appropriate modeling and measuring, it is impossible neither to measure nor to compute this quite often even dominant part $I_{rad}$ of the overall (heat-) energy flow $I_E(A_{12})$ of the respective device under test.

To overcome these problems, the invention uses models which allow for almost any practical measuring object a physical correctness and an adequate precision.

$A_{12}$ is a grey ($\varepsilon_1$-) emitter, which does not measurably influence its respective 2π-environment. Thus, its equivalent black-body radiation with $T_S(x,y)$ is completely absorbed by its respective environment!

The relevant $2\pi$ heat radiation of the environment onto $A_{12}$ is characterized by the measuring of the respective black-body radiation ($\varepsilon_{2=1}$) temperature $T_{rad}(2\pi\text{-hem}(A_{12}(x, y)))$ of the corresponding $2\pi$-hemisphere with sufficient precision!

A $2\pi$ heat radiation camera (along the z-axis of $A_{12}$) does measure exactly that very $2\pi$ black-body (heat) radiation and its $T_{rad}(2\pi\text{-hem}(A_{12}(x,y)))$ with sufficient precision!

With these simplifications, for the first time, it is possible to measure and compute $I_{rad}$ completely. This implies that the unsolvable (Planck-law) integral for the radiation heat-flow $I_{rad}=\int A_{12}[C_{12}(\ldots)*(T_S^4(\ldots)-T_{rad}^4(2\pi\text{-hem}(A_{12}(\ldots))))]$ can be replaced by a simple formula to compute $I_{rad}$.

By this the integral for $C_{12}(\ldots)$ is simplified to the formula $C_{12}=\varepsilon_1(x,y)*(\varepsilon_2=1)*\sigma$ with the Bolzmann constant $\sigma$. The Planck-formula for the radiation heat-flow $I_{rad}$ thus transforms to $I_{rad}=\int_{A12}[C_{12}*(T_S^4(x,y)-T_{rad}^4(2\pi\text{-hem}(A_{12}(x,y))))]$. This (integral-) formula can now be computed and added together for each $\Delta A_{12}(x,y)$ in a most simple way. By this the only problem remaining is, according to the invention, solely the measurement and integration of the equivalent back-radiation temperatures $T_{rad}^4(2\pi\text{-hem}(A_{12}(x,y)))$ into this formula and the corresponding models.

In doing so, one can distinguish in case between one effective $2\pi$-Temperature $T_R^4(2\eta)$, between at least two temperatures ($T_{Ra}^4(\phi 1)$, $T_{Rb}^4(\phi 2)$) with $\phi 1+\phi 2=2\pi$ and between up to some M×K spatial-angles and their corresponding $T_{Rmk}^4(\phi_m,\phi_k)$ with $\Sigma_i\phi_i=2\pi$.

As a consequence, the automation and the simultaneity of the measuring according to the invention, do even permit to determine the thermal capacity $C_H$ and the thermal inertia $\tau_H$ von $A_{12}$ respectively by a time series analysis.

According to the invention, the method is based on
the automated compilation of a physically correct convection energy-flow model ($\Leftrightarrow \alpha_k(\ldots)$), based on measured surface temperatures $T_S(x,y)$, geometries ($L_{char}, \gamma_S, \ldots$) and environmental parameters ($T_{fld}, v_{fld}, \ldots$), to compute the corresponding energy flow $I_{cnv}$ via $A_{12}$ in amount and direction.
the automated compilation of a physically correct radiation energy-flow model ($\Leftrightarrow \varepsilon_k(A_i)$, $C_{12}(\ldots) T_S^4(x,y,z)$, $T_{Rmk}^4(\phi_m,\phi_k), \ldots$), based on measured surface temperatures $T_S(x,y,z)$, back-radiation temperatures $T_{Rmk}^4(\phi_m, \phi_k)$ and geometries ($\Leftrightarrow$ footprint $(x,y, \phi_x, \phi_y)$), to compute the corresponding energy-flow $I_{rad}$ via $A_{12}$ in amount and direction.
the simultaneous and automated measuring of the following parameters for the measuring surface $A_{12}$:
geometry (dimensions, spat. position, $L_{char}, \gamma_S, \ldots$),
surface temperatures $T_S(x,y)$,
relevant ($\Leftrightarrow A_{12}(x,y,z)$) $2\pi$ back-radiation $T_{Rmk}^4(\phi_m, \phi_k)$ and
environmental parameters $T_{fld}(\text{int})$, $T_{fld}(\text{ext})$, $v_{fld}$, . . . .

The separate measurement of the "back-radiation" temperatures of "sky" and of "earth" is most advisable, considering their in general quite large temperature differences. In case of "more complex" radiation environments, the invented technique offers an abundance of possibilities, e.g. by using a M×K thermal camera, to measure and compute this influence on the respective heat-flow in an easy and physically correct way.

The invention claimed is:

1. Method for measurement and computation of heat transmission through an enveloping surface of an object under test, comprising the steps of:
dividing the enveloping surface into surface elements ($\Delta A_{i,k}$), each surface element having a geometry and spatial position;
measuring surface temperature of each surface element and back radiation temperature of a $2\pi$-hemisphere environment surrounding the respective surface elements;
measuring the back radiation temperature by an integrated $2\pi$-hemisphere radiation sensor;
measuring the surface temperature contact-free via a thermal imaging device and determining at the same time the geometry and spatial position of the surface element being measured by an integrated automatic geometry measurement system; and
calculating the heat transmission through the enveloping surface as a sum of convection heat flow at each surface element and a sum of radiation heat flow at each surface element;
wherein the convection heat flow at each surface element is based on the surface temperature of each surface element; and
wherein the radiation heat flow at each surface element is based on the surface temperature of each surface element and the back radiation temperature, the radiation heat flow at each surface element is calculated based on $(T_s^4-T_{rad}^4)$, where $T_s$ is the temperature of the surface element and $T_{rad}$ is the back radiation temperature, wherein back radiation temperature comprises heat energy radiation strength of the respective $2\pi$-hemisphere environment.

2. Method according to claim 1, wherein for measurement of the surface temperature, a thermal imaging camera is used.

3. Method according to claim 1, wherein the $2\pi$-hemisphere radiation sensor includes a thermal imaging camera.

4. Method according to claim 1, wherein the geometry of the respective enveloping surface is determined while computing heat convection.

5. Method according to claim 1, wherein the object under test is a building and heat-conduction losses to building soil is determined.

6. Method according to claim 5, wherein the-heat-conduction losses are determined by taking the difference of an integral heat transfer measurement from outside and from inside the building.

7. Method according to claim 1, wherein the enveloping surface is a building envelope.

8. Method according to claim 1, wherein the back radiation temperature of the environment of each surface element is determined according to at least two selectable spatial angles ($\varphi_{sky}, \varphi_{earth}$) separately at the same time the respective temperature of the surface element is measured.

9. Method according to claim 8, wherein the $2\pi$-hemisphere radiation sensor includes a camera having M×K pixel resolution.

10. Method according to claim 8, wherein:
the measuring the back radiation temperature by the integrated $2\pi$-hemisphere radiation sensor is performed by the thermal imaging device with an additional panorama camera function for an automatic acquisition of the respective radiation data of the complete $2\pi$-hemisphere environment of the measured surface element.

11. Method according to claim 1, wherein the integrated automatic geometry measurement system is implemented by a camera that uses 3 or more measuring beams ($S_1, S_2, S_3, \ldots$) with known mutual angles ($\alpha_{12}, \alpha_{13}, \alpha_{23}, \ldots$) to 3 or more points ($P_1$, $P_2$, $P_3$, ...) on the respective surface elements to determine their distances and spatial positions relative to an image plane comprising pixels of the camera and thus allows via trigonometric calculations to assign real physical dimensions to each image pixel on the image plane of the surface elements of the object under test and thus allows to assign real x-y-z-coordinates to an overall image on the camera.

12. Arrangement for computation of a heat transfer through an enveloping surface, comprising:
- a data processor designed to consider convection heat flow and radiation heat flow through an enveloping surface divided into surface elements, wherein surface temperature of each surface element and back radiation temperature of a $2\pi$-hemisphere environment surrounding the respective surface elements are measured;
- an integrated $2\pi$-hemisphere radiation sensor for determining the back radiation temperature of the environment of the object under test onto each measured surface element;
- a thermal imaging device for measuring contact-free the respective surface temperatures of all surface elements; and
- an automatic geometry measurement system integrated with the thermal imaging device for determining the geometry and the spatial position of the surface elements;
- wherein the data processor is configured to calculate the heat transfer through the enveloping surface as a sum of convection heat flow at each surface element and a sum of radiation heat flow at each surface element;
- wherein the convection heat flow at each surface element is based on the surface temperature of each surface element; and
- wherein the radiation heat flow at each surface element is based on the surface temperature of each surface element and the back radiation temperature, the radiation heat flow at each surface element is calculated based on $(T^4_s - T^4_{rad})$, where $T_s$ is the temperature of the surface element and $T_{rad}$ is the back radiation temperature, wherein back radiation temperature comprises heat energy radiation strength of the respective $2\pi$-hemisphere environment.

13. Arrangement according to claim 12, wherein the thermal imaging device is a thermal camera.

* * * * *